(12) United States Patent
Ito et al.

(10) Patent No.: US 11,148,705 B2
(45) Date of Patent: Oct. 19, 2021

(54) STEERING COLUMN DEVICE

(71) Applicant: FUJI KIKO CO., LTD., Shizuoka (JP)

(72) Inventors: Yoshiyasu Ito, Shizuoka (JP); Takahiro Baitou, Shizuoka (JP)

(73) Assignee: FUJI KIKO CO., LTD., Kosai (JP)

( * ) Notice: Subject to any disclaimer, the term of this patent is extended or adjusted under 35 U.S.C. 154(b) by 0 days.

(21) Appl. No.: 16/935,274

(22) Filed: Jul. 22, 2020

(65) Prior Publication Data
US 2021/0024119 A1    Jan. 28, 2021

(30) Foreign Application Priority Data

Jul. 25, 2019 (JP) .............................. JP2019-136918

(51) Int. Cl.
*B62D 1/184* (2006.01)
*B62D 1/19* (2006.01)
*B62D 1/187* (2006.01)

(52) U.S. Cl.
CPC ............. *B62D 1/195* (2013.01); *B62D 1/187* (2013.01); *B62D 1/184* (2013.01)

(58) Field of Classification Search
CPC ......... B62D 1/195; B62D 1/187; B62D 1/184
USPC .................................................. 74/492, 493
See application file for complete search history.

(56) References Cited

U.S. PATENT DOCUMENTS

| 4,989,898 | A | * | 2/1991 | Yamaguchi | ............ | B62D 1/195 |
| | | | | | | 280/777 |
| 6,575,497 | B1 | * | 6/2003 | McCarthy | .............. | B62D 1/195 |
| | | | | | | 280/777 |
| 9,032,834 | B2 | * | 5/2015 | Inoue | ..................... | B62D 1/185 |
| | | | | | | 74/493 |
| 9,242,667 | B2 | * | 1/2016 | Yoshihara | .............. | B62D 1/189 |
| 2008/0236326 | A1 | * | 10/2008 | Matsui | .................... | F16F 7/123 |
| | | | | | | 74/493 |
| 2009/0249916 | A1 | * | 10/2009 | Ridgway | ................ | B62D 1/192 |
| | | | | | | 74/492 |
| 2014/0182409 | A1 | * | 7/2014 | Nagase | .................. | B62D 1/195 |
| | | | | | | 74/493 |

FOREIGN PATENT DOCUMENTS

JP             2017-30476 A        2/2017

* cited by examiner

*Primary Examiner* — Toan C To
(74) *Attorney, Agent, or Firm* — Nath, Goldberg & Meyer; Jerald L. Meyer

(57) ABSTRACT

A steering column device includes: a lower tube configured to be attached to a vehicle body; a upper tube provided to be movable relative to the lower tube in a vehicle body front-rear direction; and a cylindrical retainer interposed between the lower tube and the upper tube. In addition, the steering column device includes an energy absorption mechanism arranged between the lower tube and the upper tube. The energy absorption mechanism has: a long hole provided in the lower tube; a restriction portion provided on the retainer and arranged in the long hole; and a restriction projection provided on the upper tube, and arranged in the long hole while being positioned on a rear side of the vehicle body relative to the restriction portion.

4 Claims, 5 Drawing Sheets

FR ←—→ RR

STEERING COLUMN DEVICE

CROSS REFERENCE TO RELATED APPLICATIONS

The present application is based on, and claims priority from Japanese Patent Application No. 2019-136918, filed Jul. 25, 2019, the disclosure of which is hereby incorporated by reference herein in its entirety.

BACKGROUND

1. Technical Field

The present invention relates to a steering column device.

2. Description of the Related Art

A steering column device according to Japanese Patent Application Publication No. 2017-30476 includes: a vehicle-body attachment bracket configured to be fixed to a vehicle body and having a pair of sidewall portions; and a steering column arranged between the pair of sidewall portions along a vehicle body front-rear direction. The pair of sidewall portions in the vehicle-body attachment bracket support the steering column such that the steering column is movable in a tilt direction and a telescopic direction. The steering column is formed of: an upper tube on which to support a steering wheel; and a lower tube provided to cover the outer periphery of the upper tube. In addition, an energy absorption mechanism is provided between the lower tube and the upper tube.

SUMMARY

In the above steering column device, the upper tube is prevented from rotating relative to the lower tube in a normal operation by a restriction projection of the energy absorption mechanism. However, in the above steering column device, the energy absorption mechanism does not have a function of preventing the upper tube from rotating relative to the lower tube after energy absorption.

In view of this, an object of the present invention is to provide a steering column device capable of preventing an upper tube from rotating relative to a lower tube after energy absorption by using an energy absorption mechanism.

A steering column device according to one aspect of the present invention includes: a lower tube configured to be attached to a vehicle body; an upper tube provided to be movable relative to a lower tube in a vehicle body front-rear direction; and a cylindrical retainer interposed between the lower tube and the upper tube. In addition, the steering column device includes an energy absorption mechanism arranged between the lower tube and the upper tube. The energy absorption mechanism has: a long hole provided in the lower tube along the vehicle body front-rear direction; a restriction portion provided on the retainer and arranged in the long hole; and a restriction projection provided on the upper tube, and arranged in the long hole while being positioned on a rear side of the vehicle body relative to the restriction portion. When the upper tube receives an impact load forward of the vehicle body, the restriction projection is pressed against and breaks the restriction portion.

According to the steering column device of the one aspect of the present invention, it is possible to prevent the upper tube from rotating relative to the lower tube after energy absorption by using the energy absorption mechanism.

DESCRIPTION OF EMBODIMENTS

Figure 1:
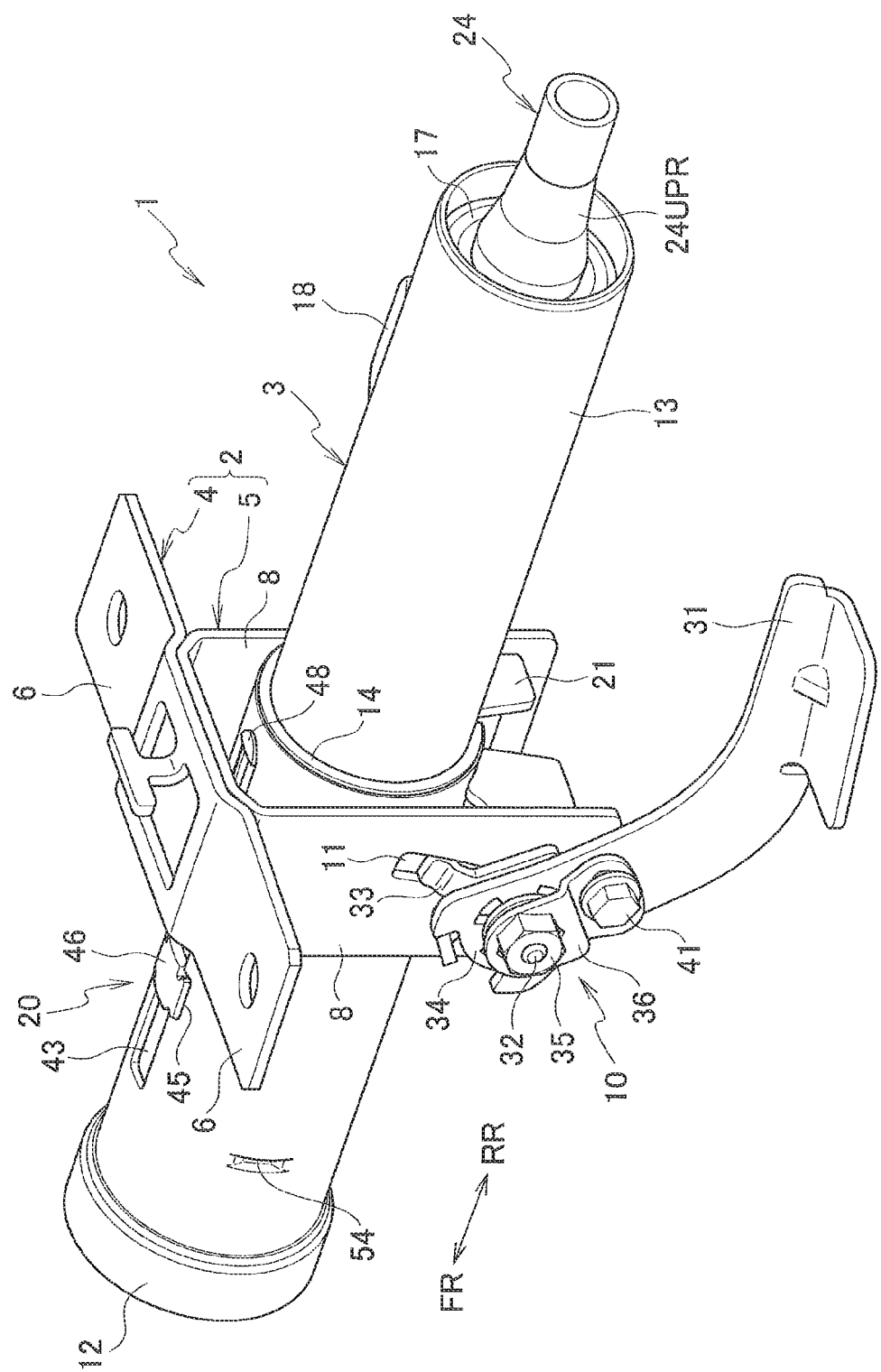
FIG. 1 is a schematic perspective view illustrating a steering column device according to an embodiment of the present invention.

Hereinafter, an embodiment of the present invention will be described in detail with the drawings.

Note that in the drawings, the arrow FR indicates a vehicle body front side in a vehicle body front-rear direction and the arrow RR indicates a vehicle body rear side in the vehicle body front-rear direction.

A steering column device 1 according to the present embodiment illustrated in FIG. 1 is a manual type. In addition, as illustrated in FIG. 1, the steering column device 1 includes: a vehicle-body attachment bracket 2 configured to be fixed to a vehicle body; and a steering column 3 supported by the vehicle-body attachment bracket 2 to be swingable in a vehicle body up-down direction (such that the tilt position is adjustable).

Figure 2:
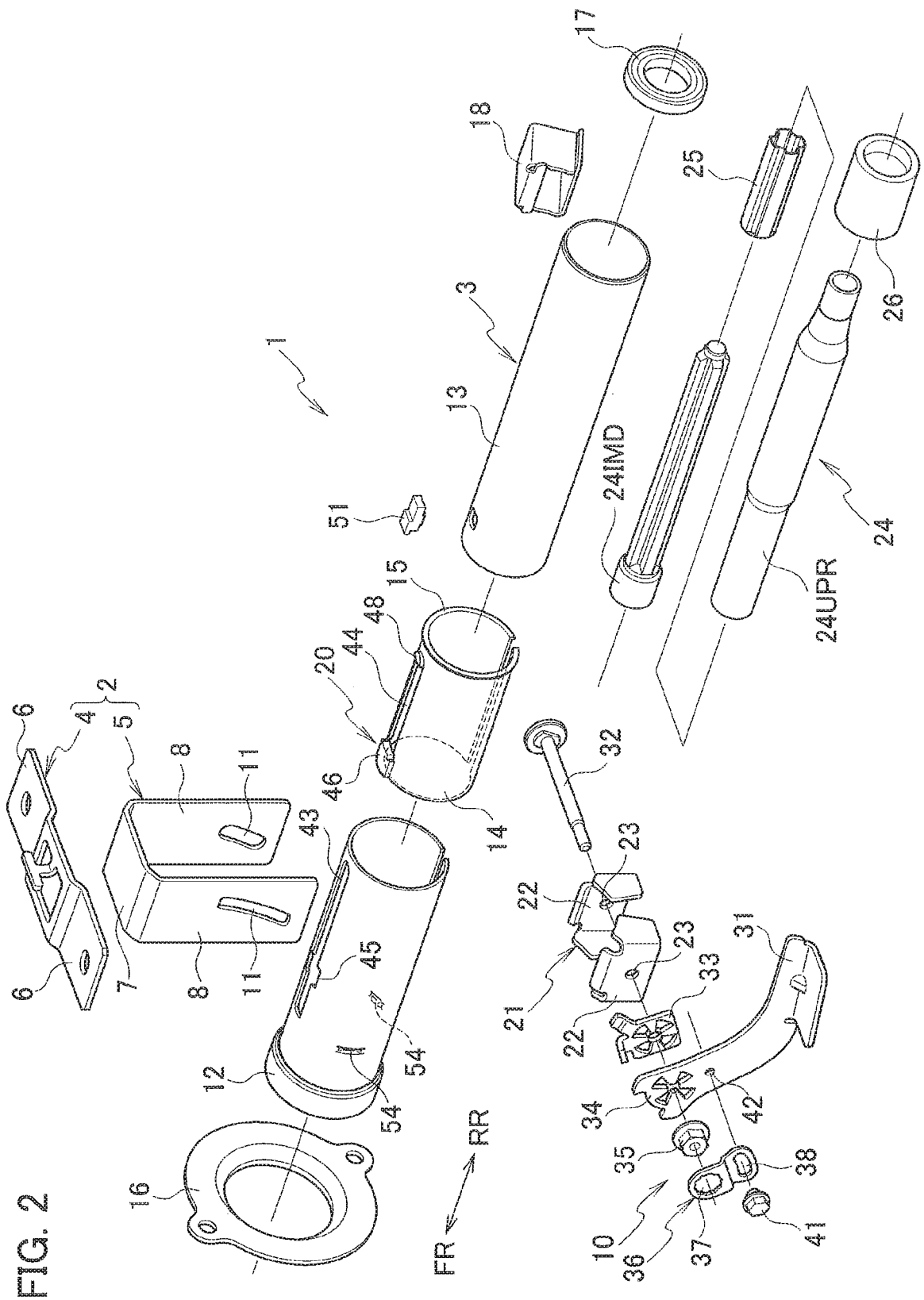
FIG. 2 is a schematic exploded perspective view illustrating the steering column device according to the embodiment of the present invention.

As illustrated in FIG. 2, the vehicle-body attachment bracket 2 is formed of a mounting bracket 4 and an adjust bracket 5. The mounting bracket 4 includes a fixation portion 6 configured to be fixed to a ceiling surface (not illustrated) of the vehicle body. The adjust bracket 5 is formed into an inverted U-shape having a coupling portion 7 coupled to the mounting bracket 4 and a pair of sidewall portions 8, 8 hanging down from the coupling portion 7. In each sidewall portion 8, a long hole (tilt long hole) 11 configured to define a tilt position adjustment range along the vehicle body up-down direction (tilt direction) is open. The tilt long hole 11 is formed of an arch-shaped long hole centered at a shaft support portion which is not illustrated.

The steering column 3 is mainly formed of: a lower tube 12 arranged between the pair of sidewall portions 8, 8; and an upper tube 13 supported to be movable relative to the lower tube 12 in the vehicle body front-rear direction (such that the telescopic position is adjustable). The steering column 3 is provided with a lock mechanism 10 configured to integrally tighten the vehicle-body attachment bracket 2, the lower tube 12, and the upper tube 13.

The lower tube 12 includes a shaft support portion (not illustrated) at the front end-side portion, and the shaft support portion is pivotally supported on the vehicle body such that the rear end-side portion of the lower tube 12 swings in the vehicle body up-down direction. In addition, the lower tube 12 is made of a metal and formed into a cylindrical shape, and a retainer 14 made of a synthetic resin and formed into a cylindrical shape is arranged inside the cylinder of the lower tube 12. The retainer 14 is also called a telescopic guide and is formed in a C-shape in cross section with an open lower portion in the present embodiment. In addition, a flange portion 15 for positioning the retainer 14 relative to the lower tube 12 is formed in the rear end-side portion of the retainer 14.

The upper tube 13 made of a metal and formed into a cylindrical shape is inserted in the cylinders of the lower tube 12 and the retainer 14 in the cylinder-axial direction. In this way, the upper tube 13 is supported to be movable relative to the lower tube 12 in the cylinder-axial direction and the retainer 14 is interposed between the lower tube 12 and the upper tube 13.

Note that an annular jacket cover 16 is mounted on the front end-side portion of the lower tube 12, and a steering column bearing 17 and a steering lock bracket 18 are mounted on the rear end-side portion of the upper tube 13.

In addition, a distance bracket 21 is attached to the outer periphery of the lower tube 12. The lower tube 12 is held at a desired tilt position by the distance bracket 21 being held between the pair of sidewall portions 8, 8.

The distance bracket 21 is formed of a pair of sliding contact walls 22, 22 extending in the vehicle body up-down direction. In addition, the upper edge portion of each sliding contact wall 22 is fixed to the outer periphery of the lower tube 12. Moreover, each sliding contact wall 22 is provided with a round hole 23 through which an operation shaft 32, which will be described later, is inserted.

A steering column shaft 24 is pivotally supported inside the cylinders of the lower tube 12, the retainer 14, and the upper tube 13.

The steering column shaft 24 is formed of: an intermediate shaft 24IMD housed in the lower tube 12; and an upper shaft 24UPR housed in the upper tube 13. The intermediate shaft 24IMD and the upper shaft 24UPR are spline-coupled. This allows the intermediate shaft 24IMD and the upper shaft 24UPR to integrally rotate about the shaft and allows the upper shaft 24UPR to move relative to the intermediate shaft 24IMD in the axial direction.

Note that a sleeve 25 is interposed between the intermediate shaft 24IMD and the upper shaft 24UPR, and a key lock collar 26 is mounted on the rear end-side portion of the upper shaft 24UPR.

The lock mechanism 10 includes an operation lever 31, an operation shaft (tilt bolt) 32, a stationary cam 33, a rotating cam 34, a nut 35, and a lever stopper 36.

The operation shaft 32 penetrates the tilt long holes 11 of the pair of sidewall portions 8, 8 and the round holes 23 of the pair of sliding contact walls 22, 22 in a vehicle body width direction and is supported to be rotatable about the shaft. In addition, the one end-side end portion of the operation shaft 32 is supported by the sidewall portion 8 and the sliding contact wall 22 on the one end side. The opposite end-side end portion of the operation shaft 32 penetrates the sidewall portion 8 and the sliding contact wall 22 on the opposite end side and is then screwed into a nut 35, such that the operation lever 31, the stationary cam 33, and the rotating cam 34 are sandwiched between the nut 35 and the sidewall portion 8 and the sliding contact wall 22 on the opposite end side.

The stationary cam 33 is formed into such a shape that the operation shaft 32 penetrates the center portion of the stationary cam 33, and is arranged such that the stationary cam surface of the stationary cam 33 faces the operation lever 31 side. In addition, the stationary cam 33 is arranged such that the opposite side of the stationary cam 33 to the stationary cam surface is fitted in the tilt long hole 11, and the stationary cam 33 does not rotate about the operation shaft 32 and is movable in the tilt long hole 11. On the stationary cam surface of the stationary cam 33, projections and depressions are alternately formed in the circumferential direction.

The rotating cam 34 is formed into such a shape that the operation shaft 32 penetrates the center portion of the rotating cam 34, and is arranged such that the rotating cam surface of the rotating cam 34 faces the stationary cam surface of the stationary cam 33. In addition, the rotating cam 34 is formed together with the penetrating operation shaft 32 integrally on the operation lever 31 such that the rotating cam 34 rotates integrally with the operation lever 31 about the operation shaft 32. On the rotating cam surface of the rotating cam 34, projections and depressions are alternately formed in the circumferential direction.

The lever stopper 36 restricts the relative rotation of the operation shaft 32 and the operation lever 31.

An operation shaft-side engagement portion (first engagement portion) 37 configured to be engaged with the operation shaft 32 (nut 35) is formed on a one side end portion of the lever stopper 36 and an operation lever-side engagement portion (second engagement portion) 38 configured to be engaged with the operation lever 31 is formed on the other side end portion of the lever stopper 36.

The operation shaft-side engagement portion 37 of the lever stopper 36 is formed of a hole obtained by superposing two hexagonal holes into each of which the nut 35 can be fitted with the phases displaced by 90° from each other. The lever stopper 36 is engaged with (fixed to) the operation shaft 32 (nut 35) by fitting the operation shaft-side engagement portion 37 into the nut 35 while rotating the operation shaft-side engagement portion 37 by every 30°.

The operation lever-side engagement portion 38 of the lever stopper 36 is formed of an arch-shaped long hole centered at the operation shaft 32. The lever stopper 36 is engaged with (fixed to) the operation lever 31 by inserting the lock bolt 41 through the operation lever-side engagement portion 38 and screwing the lock bolt 41 into a bolt hole 42 provided in the operation lever 31.

In addition, in the steering column device 1, an energy absorption mechanism 20 (see FIG. 3 and FIG. 4) for absorbing energy at the time of secondary collision is arranged between the lower tube 12 and the upper tube 13.

Figure 3:
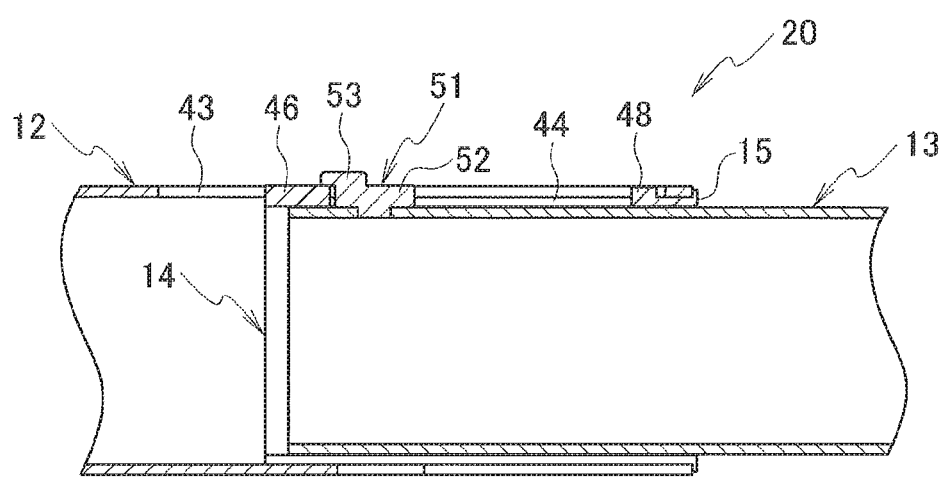
FIG. 3 is a schematic side cross-sectional view of an enemy absorption mechanism.
Figure 4:
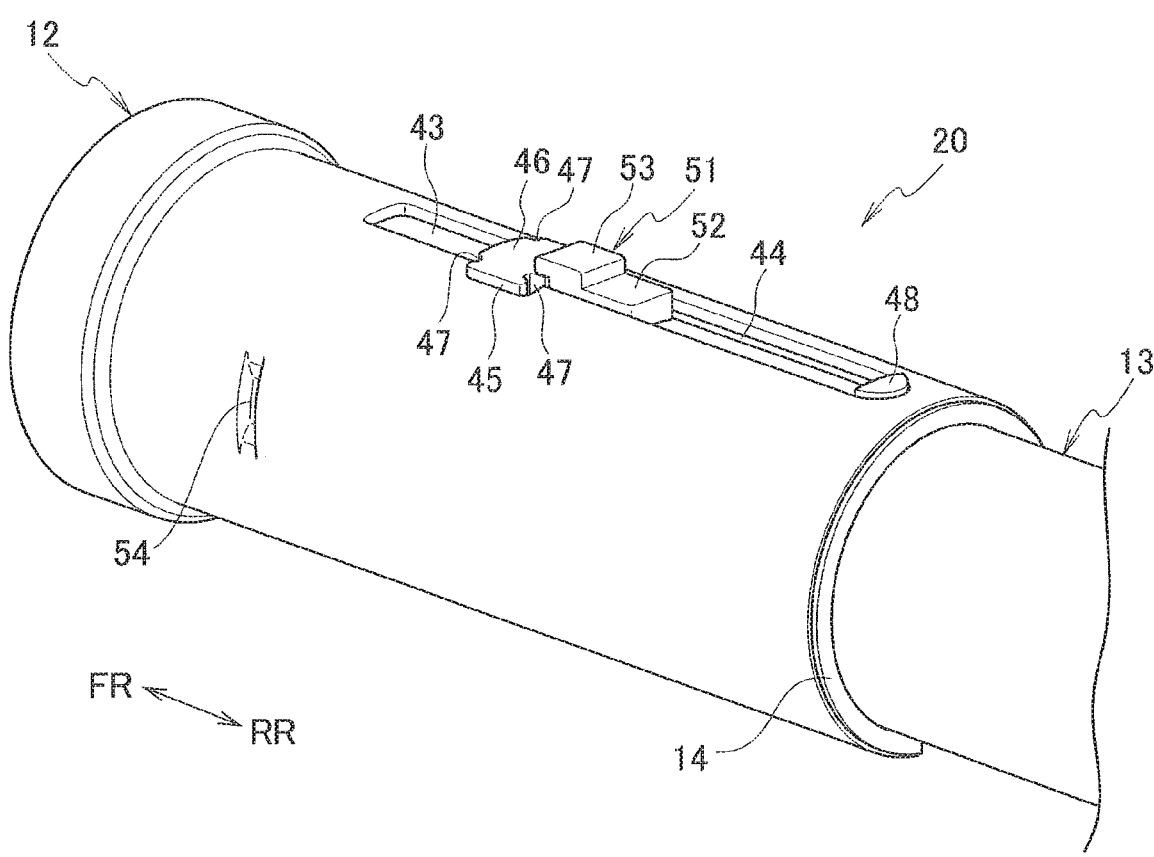
FIG. 4 is a schematic perspective view of the energy absorption mechanism and illustrates a state in a normal operation.

The energy absorption mechanism 20 illustrated in FIG. 3 and FIG. 4 is also called an EA (energy absorption) load generating unit.

As illustrated in FIG. 3 and FIG. 4, a long hole (telescopic long hole) 43 is provided in the lower tube 12 along the vehicle body front-rear direction, and the retainer 14 is provided with a slit 44 having substantially the same width as that of the long hole 43. The long hole 43 has a wide portion 45 provided in a middle of the long hole 43 in the vehicle body front-rear direction. A restriction portion 46 is formed integrally on the front end-side portion of the retainer 14 and arranged in the wide portion 45 of the long hole 43. This restriction portion 46 is provided with a cut portion 47 so that when the upper tube 13 receives an impact load forward of the vehicle body, a restriction projection 51, which will be described later, is pressed against and breaks the restriction portion 46. On the other hand, a rear end-side restriction portion 48 is formed integrally on the rear end-side portion of the retainer 14 and is arranged in the long hole 43.

On the other hand, the restriction projection 51 made of a metal is provided on the outer periphery of the upper tube 13, and this restriction projection 51 is arranged in the long hole 43 while being positioned on the rear side of the vehicle body relative to the restriction portion 46. The restriction projection 51 is formed of, for example, a sintered member obtained by sintering and molding a metal powder. The restriction projection 51 has: a projection main body portion 52 arranged in the long hole 43 and configured to be pressed against the restriction portion 46 at the time of energy absorption; and a projecting out portion 53 projecting out from the upper portion of the projection main body portion 52 forward of the vehicle body.

In a normal operation, as the upper tube 13 moves relative to the lower tube 12, the restriction projection 51 moves in the long hole 43 between the restriction portion 46 and the rear end-side restriction portion 48 along the vehicle body front-rear direction. Hence, the restriction projection 51 of the energy absorption mechanism 20 has a function of defining the telescopic position adjustment range along the vehicle body front-rear direction (telescopic direction).

Note that a stopper 54 ((see FIG. 2) which restricts the movement of the upper tube 13 relative to the lower tube 12 after energy absorption is provided on the inner periphery of the lower tube 12.

Next, the procedure of operating the steering column device 1 of the present embodiment will be described.

To fix the upper tube 13 at a desired position, the upper tube 13 is first moved to the desired position in the tilt direction (vehicle body up-down direction) and the telescopic direction (vehicle body front-rear direction), and the operation lever 31 is swung upward. Swinging the operation lever 31 upward turns the operation shaft 32 in the tightening direction about the shaft.

As the operation shaft 32 is turned in the tightening direction, the projections of the stationary cam 33 and the projections of the rotating cam 34 face each other to increase the dimension in the axial direction. This tightens up the operation shaft 32, so that the sliding contact walls 22 of the distance bracket 21 are held between the pair of sidewall portions 8, 8 and the upper tube 13 is held at the desired position.

In addition, to adjust the position of the upper tube 13, the tightening of the lower tube 12 and the upper tube 13 to the vehicle-body attachment bracket 2 is released. For this, the operation lever 31 is first swung downward. Swinging the operation lever 31 downward turns the operation shaft 32 in the tightening releasing direction about the shaft.

As the operation shaft 32 is turned in the tightening releasing direction, the projections of the stationary cam 33 and the depressions of the rotating cam 34 face each other to reduce the dimension in the axial direction. This loosens the operation shaft 32 to increase the interval between the pair of sidewall portions 8, 8 and release the pressure contact of the sidewall portions 8 and the sliding contact walls 22 of the distance bracket 21, so that the upper tube 13 becomes movable relative to the vehicle-body attachment bracket 2 in the tilt direction and the telescopic direction.

Next, the operations and effects of the steering column device 1 at the time of secondary collision will be described.

Figure 5:
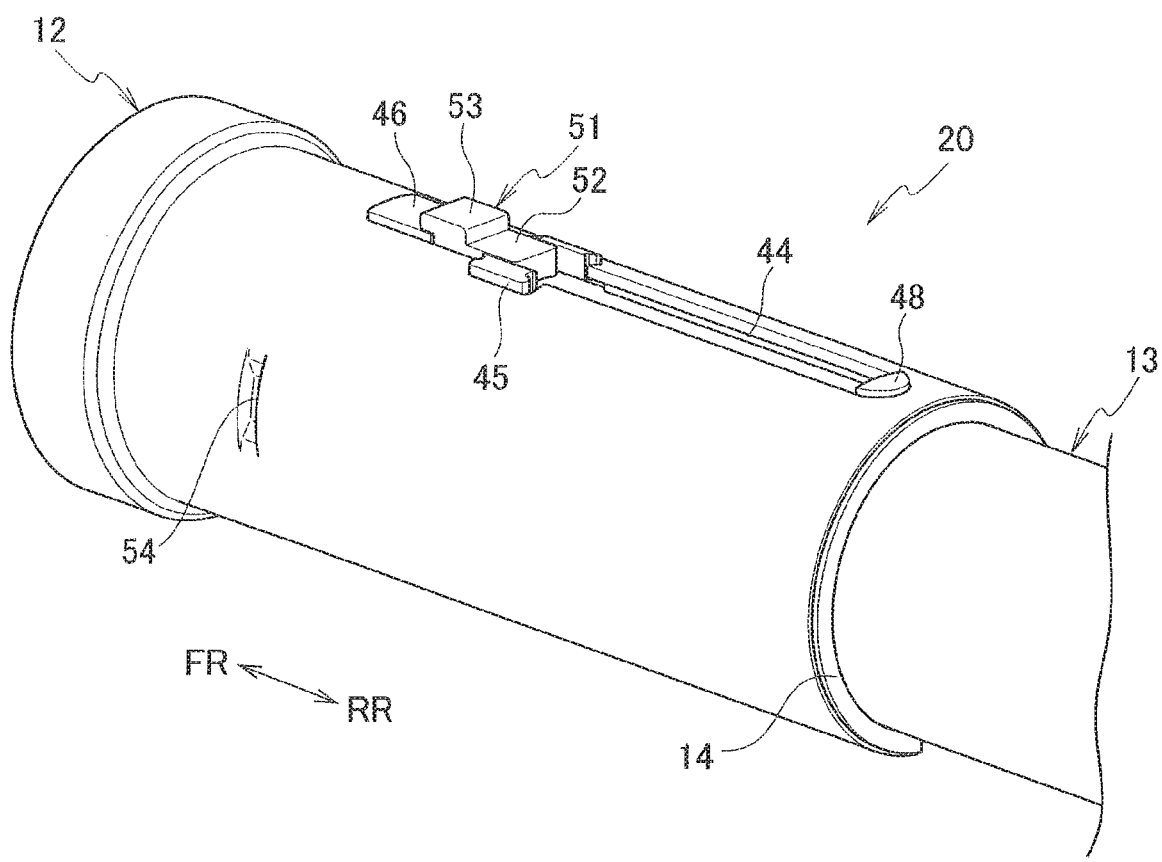
FIG. 5 is a schematic perspective view of the energy absorption mechanism and illustrates a state after energy absorption.

When the upper tube 13 is moved forward along the axial direction by an impact load applied to the steering wheel from the driver at the time of secondary collision, this movement presses the restriction projection 51 provided on the outer periphery of the upper tube 13 against the restriction portion 46 provided on the retainer 14. At this time, the restriction portion 46 receives a shearing force of a predetermined value or more from the restriction projection 51, so that part of the restriction portion 46 is broken and separated from the retainer 14. As illustrated in FIG. 5, the restriction portion 46 separated from the retainer 14 moves forward together with the upper tube 13. This breakage and separation of the restriction portion 46 from the retainer 14 absorbs energy at the time of secondary collision.

In addition, when the upper tube 13 moves forward along the axial direction, the energy at the time of secondary collision is absorbed also by the sliding resistance with the retainer 14. In this way, relatively large energy is effectively absorbed by the breakage and separation of the restriction portion 46 and the sliding resistance of the upper tube 13 against the retainer 14.

The operations and effects of the present embodiment will be described below.

(1) The steering column device 1 includes: the lower tube 12 configured to be attached to the vehicle body; and the upper tube 13 provided to be movable relative to the lower tube 12 in the vehicle body front-rear direction. In addition, the steering column device 1 includes: the cylindrical retainer 14 interposed between the lower tube 12 and the upper tube 13; and the energy absorption mechanism 20 arranged between the lower tube 12 and the upper tube 13. The energy absorption mechanism 20 has the long hole 43 provided in the lower tube 12 along the vehicle body front-rear direction; and the restriction portion 46 provided on the retainer 14 and arranged in the long hole 43. In addition, the energy absorption mechanism 20 has the restriction projection 51 provided on the upper tube 13, and arranged in the long hole 43 while being positioned on the rear side of the vehicle body relative to the restriction portion 46. When the upper tube 13 receives an impact load forward of the vehicle body, the restriction projection 51 is pressed against and breaks the restriction portion 46.

According to the steering column device 1 of the present embodiment, it is possible to prevent the upper tube 13 from rotating relative to the lower tube 12 after energy absorption by using the restriction projection 51 of the energy absorption mechanism 20.

(2) The long hole 43 has the wide portion 45 provided in a middle of the long hole 43 in the vehicle body front-rear direction, and the restriction portion 46 is formed integrally on the retainer 14 and arranged in the wide portion 45 of the long hole 43.

Utilizing the long hole (telescopic long hole) 43, the restriction projection 51, and the like, which are the fundamental elements of the steering column device 1, as the constituent elements of the energy absorption mechanism 20 makes it possible to reduce the number of components of the energy absorption mechanism 20.

(3) The material forming the restriction portion 46 is a resin, and the material forming the restriction projection 51 is a metal.

For this reason, the restriction portion 46 is relatively easily broken by the restriction projection 51, and generation of an excessive EA load can be suppressed. In addition, since there is no need for dimensional precision between metals, and the restriction portion 46 can be easily molded with a resin, the manufacture is easy and the processing cost can be reduced.

It should be noted that although the steering column device of the present invention has been described using the above-described embodiment as an example, not only this embodiment but also various other embodiments may be employed without departing from the scope of the present invention.

What is claimed is:
1. A steering column device comprising:
a lower tube configured to be attached to a vehicle body;
an upper tube provided to be movable relative to the lower tube in a vehicle body front-rear direction;

a cylindrical retainer interposed between the lower tube and the upper tube;
an energy absorption mechanism arranged between the lower tube and the upper tube, wherein
the energy absorption mechanism has:
a long hole provided in the lower tube along the vehicle body front-rear direction;
a restriction portion provided on the retainer and arranged in the long hole; and
a restriction projection provided on the upper tube, and arranged in the long hole while being positioned on a rear side of the vehicle body relative to the restriction portion, and
when the upper tube receives an impact load forward of the vehicle body, the restriction projection is pressed against and breaks the restriction portion.

2. The steering column device according to claim 1, wherein
the long hole has a wide portion provided in a middle of the long hole in the vehicle body front-rear direction,
the restriction portion is formed integrally on the retainer and arranged in the wide portion of the long hole.

3. The steering column device according to claim 1, wherein
a material forming the restriction portion is a resin, and a material forming the restriction projection is a metal.

4. The steering column device according to claim 2, wherein
a material forming the restriction portion is a resin, and a material forming the restriction projection is a metal.

* * * * *